United States Patent
Sherpa et al.

(10) Patent No.: US 11,978,486 B1
(45) Date of Patent: May 7, 2024

(54) SYSTEMS AND METHODS FOR INSERTING TRANSITIONS INTO VIDEO EDITS

(71) Applicant: GoPro, Inc., San Mateo, CA (US)

(72) Inventors: David Sherpa, San Mateo, CA (US); Thomas Achddou, Paris (FR)

(73) Assignee: GoPro, Inc., San Mateo, CA (US)

( * ) Notice: Subject to any disclaimer, the term of this patent is extended or adjusted under 35 U.S.C. 154(b) by 26 days.

(21) Appl. No.: 17/707,638

(22) Filed: Mar. 29, 2022

(51) Int. Cl.
*G11B 27/00* (2006.01)
*G06T 7/20* (2017.01)
*G06T 7/70* (2017.01)
*G11B 27/036* (2006.01)
*H04N 5/90* (2006.01)
*H04N 5/93* (2006.01)

(52) U.S. Cl.
CPC .......... *G11B 27/036* (2013.01); *G06T 7/20* (2013.01); *G06T 7/70* (2017.01); *G06T 2207/10016* (2013.01); *G06T 2207/30244* (2013.01)

(58) Field of Classification Search
CPC . G11B 27/00; H04N 5/93; H04N 5/90; G06T 7/70; G06T 7/20; G06T 27/10
USPC .......................... 386/280, 278, 282, 239, 248
See application file for complete search history.

(56) References Cited

U.S. PATENT DOCUMENTS 7,630,021 B2 * 12/2009 Matsuzaka ............. G06V 20/40
348/700

* cited by examiner

*Primary Examiner* — Daquan Zhao
(74) *Attorney, Agent, or Firm* — ESPLIN & ASSOCIATES, PC

(57) ABSTRACT

A video edit may include two videos arranged in a sequence. Motion within the one or both of the videos may be assessed. A transition effect may be selected based on the motion assessed within the video(s), and the video edit may be modified to include the transition effect between the videos. The transition effect may emphasize the motion assessed within the video(s) and/or create continuity of motion during transition between the two videos within the video edit.

20 Claims, 8 Drawing Sheets

400

SYSTEMS AND METHODS FOR INSERTING TRANSITIONS INTO VIDEO EDITS

FIELD

This disclosure relates to inserting transition effects into video edits based on motion assessed within videos.

BACKGROUND

A video edit may include multiple videos arranged in a sequence. Adjacent videos in the video edit may have non-matching motion. For example, a video in the video edit may have pan motion while the next video may not have any motion or have dolly motion. Differences in motion between adjacent videos may result in jarring or robotic transition between the adjacent videos.

SUMMARY

This disclosure relates to inserting transition effects into video edits. Video edit information and/or other information may be obtained. The video edit information may define a video edit. The video edit may include a sequence of a first video and a second video adjacent to the first video. Motion within the first video may be assessed. One or more transition effect(s) may be selected based on the motion assessed within the first video and/or other information. The video edit may be modified to include the transition effect(s) between the first video and the second video.

A system for inserting transition effects into video edits may include one or more electronic storage, processor, and/or other components. The electronic storage may store video edit information, information relating to video edits, information relating to videos, information relating to a sequence of videos, information relating to motion within videos, information relating to transition effects, information relating to modification of video edits, and/or other information.

The processor(s) may be configured by machine-readable instructions. Executing the machine-readable instructions may cause the processor(s) to facilitate inserting transition effects into video edits. The machine-readable instructions may include one or more computer program components. The computer program components may include one or more of a video edit information component, a motion component, a transition effect component, a modification component, and/or other computer program components.

The video edit information component may be configured to obtain video edit information and/or other information. The video edit information may define one or more video edits. A video edit may include a sequence of multiple videos. A video edit may include a sequence of a first video and a second video adjacent to the first video.

The motion component may be configured to assess motion within one or more videos. The motion component may assess motion within the first video. In some implementations, the motion component may assess motion within the second video. In some implementations, the motion within the video(s) may be assessed as pan motion, dolly motion, and/or other motion.

In some implementations, the motion within the video(s) may be assessed based on position information for the video(s) and/or other information. The position information for a video may characterize positions of an image capture device during capture of the video. In some implementations, the position information for a video may characterize positions of an image capture device during capture of the video by characterizing speed and/or acceleration of the image capture device during the capture of the video.

The transition effect component may be configured to select one or more transition effects based on the motion assessed within one or more of the videos and/or other information. The transition effect component may select transition effect(s) based on the motion assessed within the first video. In some implementations, the transition effect component may select the transition effect(s) further based on the motion assessed within the second video.

In some implementations, selection of the transition effect(s) based on the motion assessed within a video may include selection of different transition effects based on the motion within the video being assessed as the pan motion, the dolly motion, and/or other motion.

The modification component may be configured to modify the video edit(s). A video edit may be modified to include the transition effect(s) between the videos. A video edit may be modified to include the transition effect(s) between the first video and the second video. In some implementations, the first video may precede the transition effect in the video edit. In some implementations, the first video may follow the transition effect in the video edit.

In some implementations, a transition effect may emphasize the motion assessed within one or more of videos. The transition effect may emphasize the motion assessed within the first video. In some implementations, a transition effect may create continuity of motion during transition between two videos within a video edit. A transition effect may create continuity of motion during transition between the first video and the second video within a video edit.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
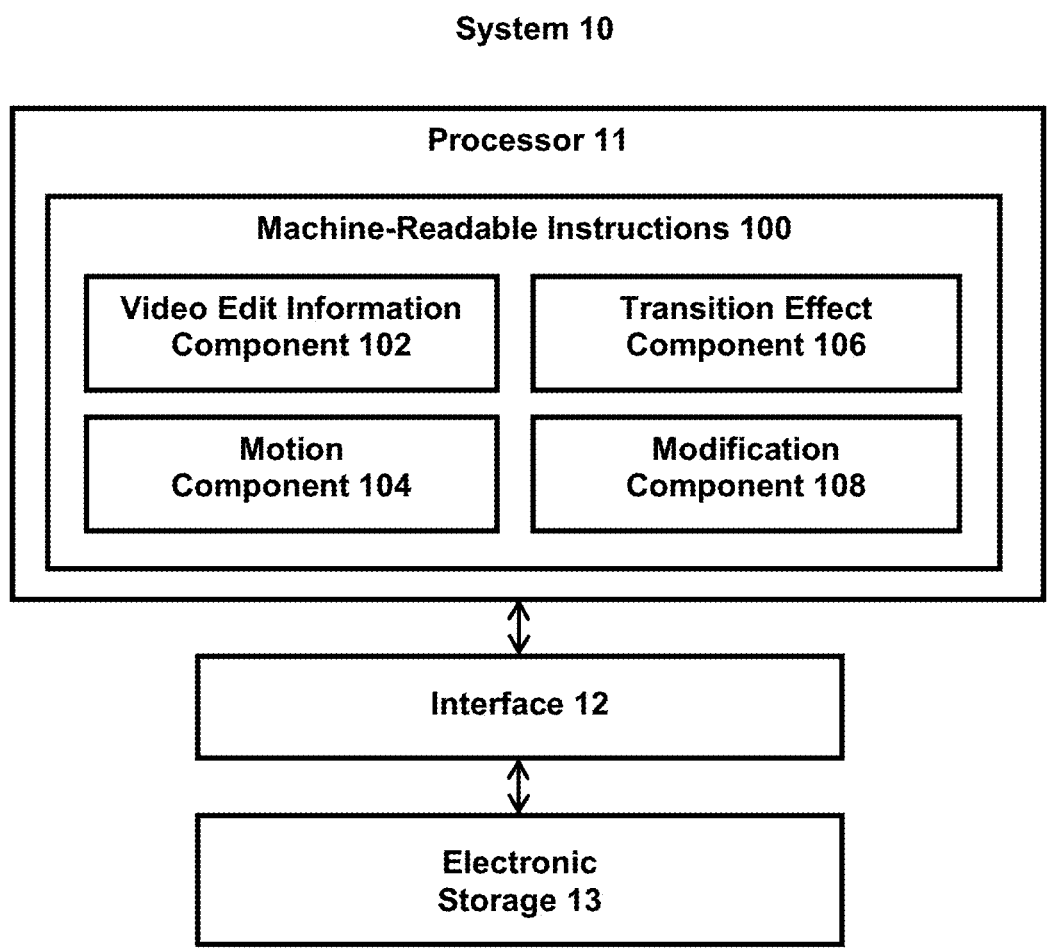
FIG. 1 illustrates an example system for inserting transition effects into video edits.

FIG. 1 illustrates a system 10 for inserting transition effects into video edits. The system 10 may include one or more of a processor 11, an interface 12 (e.g., bus, wireless interface), an electronic storage 13, and/or other components. Video edit information and/or other information may be obtained by the processor 11. The video edit information may define a video edit. The video edit may include a sequence of a first video and a second video adjacent to the first video. Motion within the first video may be assessed by the processor 11. One or more transition effect(s) may be selected by the processor 11 based on the motion assessed within the first video and/or other information. The video edit may be modified by the processor 11 to include the transition effect(s) between the first video and the second video.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video edit information, information relating to video edits, information relating to videos, information relating to a sequence of videos, information relating to motion within videos, information relating to transition effects, information relating to modification of video edits, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate inserting transition effects into video edits. The machine-readable instructions 100 may include one or more computer program components. The machine-readable instructions 100 may include one or more of a video edit information component 102, a motion component 104, a transition effect component 106, a modification component 108, and/or other computer program components.

The video edit information component 102 may be configured to obtain video edit information and/or other information. Obtaining video edit information may include one or more of accessing, acquiring, analyzing, determining, examining, generating, identifying, loading, locating, opening, receiving, retrieving, reviewing, selecting, storing, and/or otherwise obtaining the video edit information. The video edit information component 102 may obtain video edit information from one or more locations. For example, the video edit information component 102 may obtain video edit information from a storage location, such as the electronic storage 13, electronic storage of information and/or signals generated by one or more sensors, electronic storage of a device accessible via a network, and/or other locations. The video edit information component 102 may obtain video edit information from one or more hardware components and/or one or more software components.

In some implementations, the video edit information component 102 may obtain video edit information based on user interaction with a user interface/application (e.g., video editing application, video player application), and/or other information. For example, a user interface/application may provide option(s) for a user to automatically generate/modify a video edit. Video edit information may be obtained based on the user's selection of the video edit. Other selections of video edit for retrieval of video edit information are contemplated.

The video edit information may define one or more video edits. A video edit may refer to an arrangement and/or a manipulation of one or more portions of one or more videos. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Figure 3A:
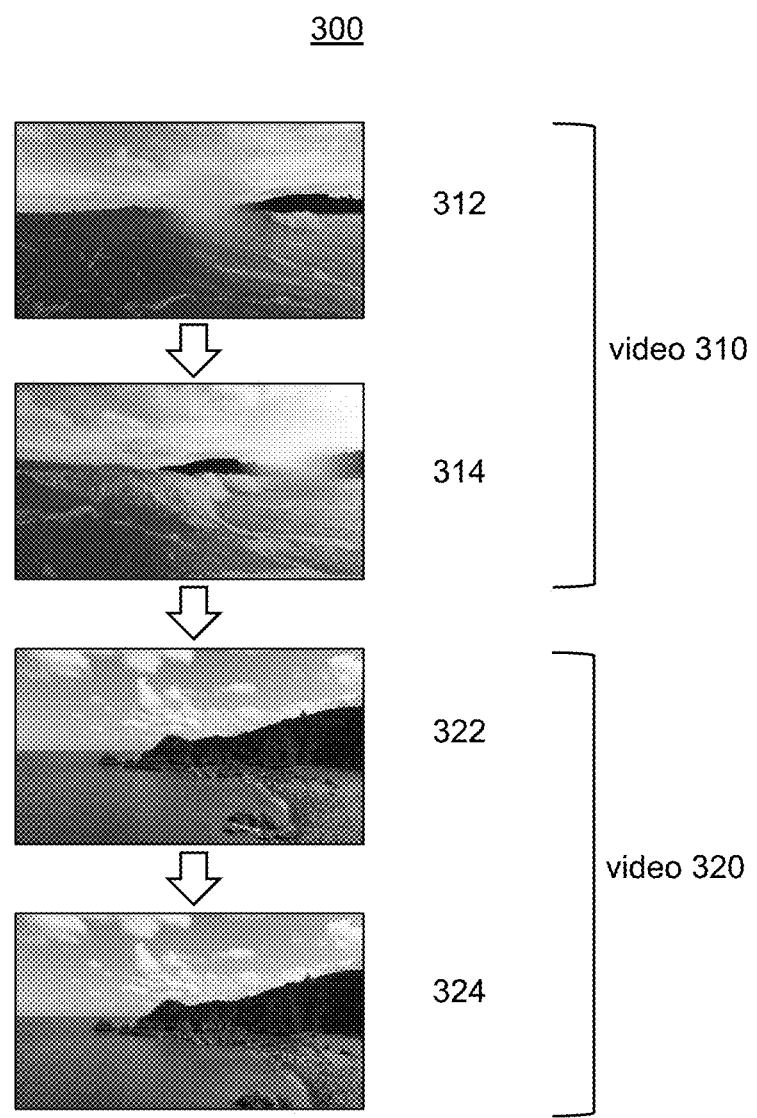
FIG. 3A illustrates an example video edit.

A video edit may include a sequence of multiple videos. A video edit may include a sequence of a first video and a second video adjacent to the first video, and/or other videos. FIG. 3A illustrates an example video edit 300. The video edit 300 may include a video 310 and a video 320. The video 310 may appear before the video 320 in the video edit 300. The video 310 may include a video frame 312, a video frame 314, and/or other video frames. The video 320 may include a video frame 322, a video frame 324, and/or other video frames.

In some implementations, the videos in the video edit may be arranged by a user. For example, a user may have used a video editing application to manually specify the ordering of the videos in the video edit. In some implementations, the videos in the video edit may be arranged by a computing device. For example, a video editing application may have automatically determined the ordering of the videos in the video edit.

The video edit information may define a video edit by including information that defines one or more content, qualities, attributes, features, and/or other aspects of the video edit. For example, the video edit information may define a video edit by including information that makes up the content of the video edit and/or information that is used to determine the content of the video edit. For instance, the video edit information may include information that makes up and/or is used to determine videos within video edit (e.g., information defining content of videos), information that defines and/or is used to determine which videos are included within the video edit, and/or other information that defines the video edit. The video edit information may be stored within a single file or multiple files. Other types of video edit information are contemplated.

The motion component 104 may be configured to assess motion within one or more videos. Assessing motion within a video may include evaluating, estimating, determining, judging, quantifying, and/or otherwise assessing the motion within the video. For exam, assessing motion within a video may include determining the type of motion within the video and/or quantifying the amount of motion within the video. The motion component may assess motion within the entirety of the video or one or more parts of the video. The motion component 104 may assess motion within one, multiples, or all of the videos within the video edit. For example, referring to FIG. 3A, the motion component 104 may assess motion within the video 310 and/or the video 320.

Motion within a video may refer to motion that was captured within the video. Motion within a video may refer to motion experienced by an image capture device during capture of the video. An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

Example motions within a video may include pan motion (e.g., camera rotated left to right, vice versa), dolly motion (e.g., camera moved forward/backward), truck motion (e.g., camera moved laterally), boom/jib motion (e.g., camera moved vertically), tilt motion (e.g., camera rotated up/down), roll motion (e.g., camera rotated over its side), and/or other type of motion. In some implementations, a limited type of motion within the video(s) may be assessed. For example, the motion within the video(s) may be assessed as pan motion, dolly motion, and/or other motion. For example, referring to FIG. 3A, the motion within the video 310 may be assessed as pan motion (e.g., panning from left to right) and the motion within the video 320 may be assessed as dolly motion (e.g., moving forward).

In some implementations, assessing motion within a video may include determining the dominant motion within the video. The dominant motion within the video may refer to the motion with the largest magnitude within the video. For example, a video may be captured by an image capture device that is experiencing more pan motion than dolly motion, and the pan motion may be determined to be the dominant motion within the video.

In some implementations, assessing motion within a video may include determining the direction of motion (e.g., dominant motion, other motion) within the video. For example, a video may include pan motion, and the direction of the pan motion (e.g., whether from left to right or right to left) may be determined. As another example, a video may include pan motion and tilt motion, and the direction of the combination of the pan motion and the tilt motion may be determined.

In some implementations, assessing motion within a video may include determining the amount of motion within the video. For example, a video may include pan motion, and the speed of the pan motion may be determined.

In some implementations, the motion within the video(s) may be assessed based on position information for the video(s) and/or other information. The position information for a video may characterize (e.g., describe and/or define) positions (e.g., rotational position, translational position) of an image capture device during capture of the video. For example, the position information for a video may characterize specific rotational position and/or translational position of the image capture device and/or specific changes in rotational position and/or translational position of the image capture device during capture of the video.

The position information may be measured/output by one or more position sensors of the image capture device that captured the video, such as one or more inertial measurement units, one or more accelerometers, one or more gyroscopes, one or more magnetometers, one or more global positioning system sensors, and/or other position sensors.

In some implementations, the position information may include data from the position sensor (e.g., gyroscope data, accelerometer data, GPS data) with time stamps for visual content capture at different moments. For example, the position may include gyroscope data, accelerometer data, and/or GPS data for different/individual video frames captured by the image capture device. In some implementations, calibration of an inertial measurement unit may be used to combine different data within the position information.

In some implementations, the position information for a video may characterize positions of an image capture device during capture of the video by characterizing speed and/or acceleration of the image capture device during the capture of the video. For example, the position information may specify values of speed and/or acceleration of the image capture device at different moments within the capture duration and/or specify values from which the speed and acceleration of the image capture device may be determined. For example, the position information may specify values of acceleration measured by an accelerometer during the capture duration. The position information may specify values that define GPS location of the image capture device during the capture duration. The position information may characterize the speed of the image capture device based on changes in the GPS location of the image capture device during the capture duration. In some implementations, the position information for a video may include information on the direction of gravity on the image capture device during capture of the video. The direction of gravity may indicate the positioning of the image capture device with respect to gravity during capture of the video (e.g., upright, tilted, flipped).

In some implementations, the motion within the video(s) may be assessed based on analysis of the video and/or other information. For example, motion within a video may be assessed based on motion vector extraction and/or other information. Motion vectors may represent motion of one or more visuals captured within individual video frames. Motion vectors may be determined using one or more of block-matching algorithm, phase correlation and frequency domain methods, pixel recursive algorithms, optical flow, feature detection, and/or other criteria matching methods.

Motion vector may represent movement of one or more pixels and/or groupings of pixels between video frames of the video content. Motion vector may represent movement of an object captured within the video from a location in a video frame to another location in another video frame (and to subsequent locations in subsequent frames). Motion vector may be characterized by direction(s) of motion (linear and/or angular) and magnitude(s) of motion.

As another example, motion within a video may be assessed based on video compression and/or other information. Video compression of a video may result in video frames that include information for entire viewable dimensions of the video frames (e.g., I-frame) and video frames that include information for portions of the viewable dimensions of the video frames (e.g., P-frame, B-frame). A video frame may include information regarding changes in the video frames from prior frames, subsequent frames, or both. Information regarding changes in the video frames may characterize/defined by the motion of the video content. Motion component 104 may use the information regarding changes in the video frame to assess the motion within the video. Other assessment of the motion of the video is contemplated.

The transition effect component 106 may be configured to select one or more transition effects. Selecting a transition effect may include ascertaining, choosing, determining, establishing, finding, identifying, obtaining, setting, and/or otherwise selecting the transition effect. A transition effect may refer to an effect for changing the view that is in the video edit from one video to another video. A transition effect may refer to manipulation of the video edit at, before, and/or after the moment at which the video edit changes from one video to another. A transition effect may manipulate the video edit by changing one or more visual characteristics of the video edit. A transition effect may manipulate the video edit by adding new visual characteristic(s) to the video edit, removing existing visual characteristic(s) from the video edit, changing existing visual characteristic(s) in the video edit, and/or otherwise manipulating visual characteristics of the video edit.

A transition effect may be selected based on the motion assessed within one or more of the videos and/or other information. A transition effect may be selected based on the type of motion within the video(s), the dominant motion within the video(s), the direction of motion within the video(s), the amount of motion within the video(s), and/or other characteristics of motion within the video(s). A transition effect may be selected for use in transition between two videos in the video edit based on the motion assessed within one or both of the videos.

In some implementations, selection of the transition effect(s) based on the motion assessed within a video may include selection of different transition effects based on different motion assessed within the video. For instance, different transition effects may exist for different types of motion, and specific transition effect may be selected based on the specific motion assessed within the video (e.g., different transition effects for the pan motion, the dolly motion, and/or other motion). In some implementations, a transition effect may be selected based on the motion assessed within a video most closely matching the motion corresponding to the transition effect. For example, a video may include both pan motion and dolly motion. The pan motion within the video may have greater similarity/less difference to the pan motion corresponding to a pan motion transition effect while the dolly motion within the video may have less similarity/greater difference to the dolly motion corresponding to a dolly motion transition effect. In such a case, the pan motion transition effect may be selected over the dolly motion transition effect. Use of other types/characteristics of motion and other types of transition effects for other types/characteristics of motion are contemplated.

Figure 3B:
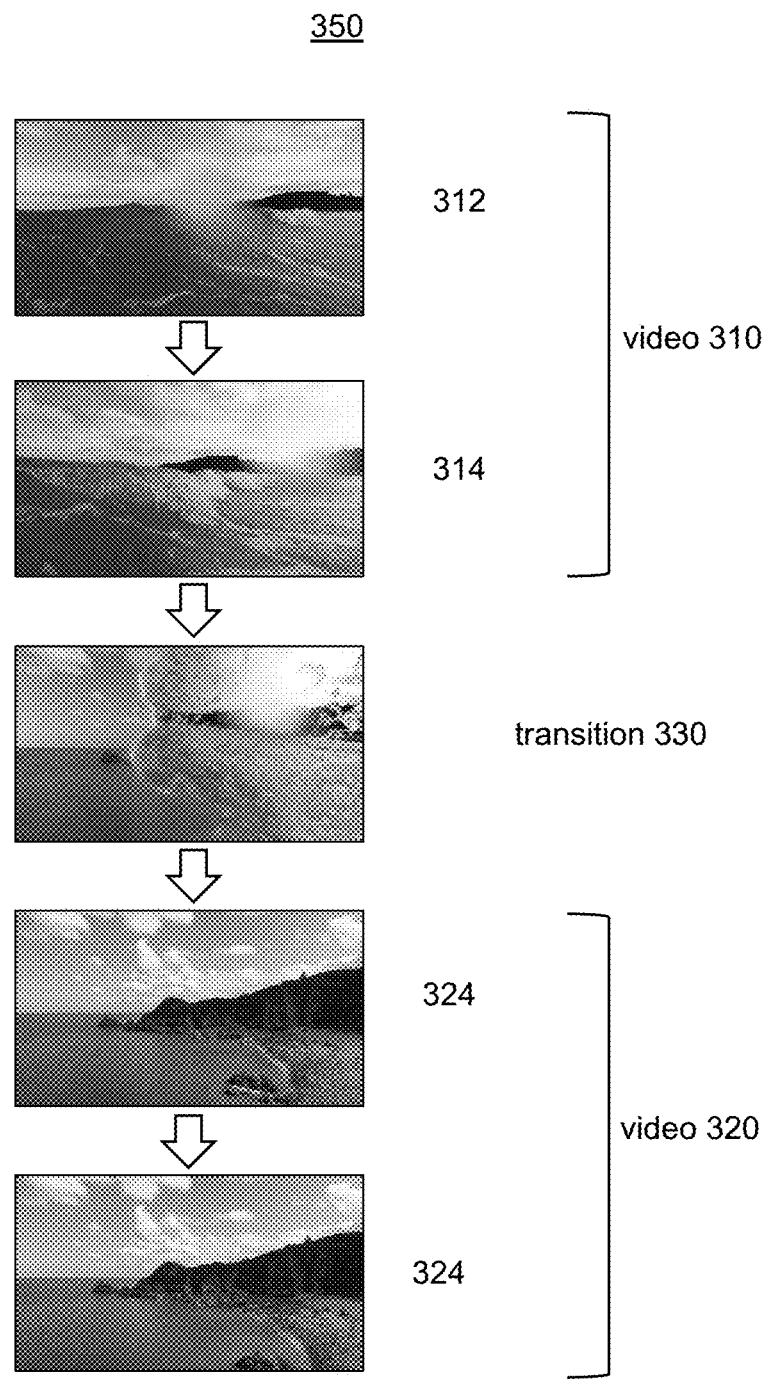
FIG. 3B illustrates an example modification of the video edit shown in FIG. 3A to insert a transition effect.

For example, referring to FIG. 3A, a transition effect may be selected for use in transition between the video 310 and the video 320 based on the motion assessed within the video 310 and/or the video 320. FIG. 3B shows an example transition 330 created in a video 350 by including a transition effect between the video 310 and the video 320. The transition effect may include simulation of a wave that swipes from left to right. The transition effect may be selected based on the motion assessed within the video 310. For example, the transition effect may be selected based on the pan motion assessed within the video 310.

In some implementations, a transition effect may emphasize the motion assessed within one or more of videos. A transition effect emphasizing the motion assessed within a video may include the transition effect highlighting or using the motion assessed within the video. For example, a transition effect may follow/match the motion within a video. For instance, referring to FIG. 3B, the transition effect (e.g., simulation of a wave that swipes from left to right) may be selected for use between the video 310 and the video 320. The transition effect may expand the motion within one video (e.g., the video 310) and pass that motion to the next video (e.g., the video 320) during the transition. For instance, the transition effect may expand the left-to-right pan motion within the video 310 and pass that left-to-right pan motion to the video 320.

In some implementations, a transition effect may create continuity of motion during transition between two videos within a video edit. For example, referring to FIG. 3A, the transition effect may create continuity of motion (e.g., left-to-right pan motion) during transition between the video 310 and the video 320 within the video edit 350. The continuity of motion between different videos (the videos 310, 320) may be created by expanding the motion from one video (e.g., the video 310) to another video (e.g., the video 320).

Figure 4:
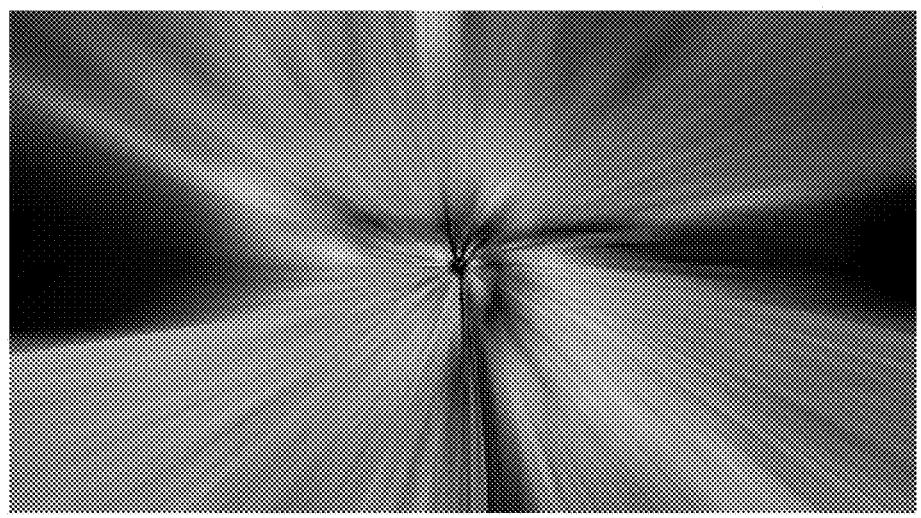
FIG. 4 illustrates an example transition effect.

FIG. 4 illustrates an example transition effect 400. The transition effect 400 may modify the video to which it is apply by stretching the pixels from the center towards the edge, or vice versa (e.g., warping effect). The transition effect 400 may be selected based on dolly motion (forward/backward motion) within a video. The transition effect may emphasize dolly motion within the video and may create continuity of dolly motion during transition between the video with the dolly motion and a video without the dolly motion. Other types of transition effects are contemplated.

In some implementation, a transition effect may be selected for use between two videos based on one of the video including motion while the other video not including motion. That is, a transition effect may be selected for use when there is a transition from a video including motion to a video not including motion, or vice versa. Such use of transition effect may make the transition between a video including motion and a video not including motion more interesting/less robotic or jarring. The transition effect may compensate for the lack of motion within one of the videos.

In some implementations, a transition effect may be selected for use between two videos based on non-matching motion being assessed between the two videos. Two videos may include non-matching motion based on the motion within the two videos being different (e.g., different type of motion, different direction, different amount of motion). In some implementations, the transition effect selected for use between two videos with non-matching motion may emphasize/expand motion within one of the videos to create a less robotic/jarring transition between different motion. In some implementations, the transition effect selected for use between two videos with non-matching motion may emphasize/expand motion between both of the videos. For example, the transition effect may initial emphasize/expand motion of the preceding video and change to emphasize/expand motion of the subsequent video. The transition effect may change from following the motion of the preceding video to follow the motion of the subsequent video. The transition effect may smooth changes in different motion between the two videos.

In some implementations, a transition effect may not be selected for use between two videos based on matching motion being assessed between the two videos. Two videos may include matching motion based on the motion within the two videos being the same or being similar (e.g., type, direction, and/or amount of motion being within one or more threshold values). When matching motion exists between two adjacent videos, the transition may be interesting without use of the transition effect. Thus, a transition effect may not be applied between two such adjacent videos.

In some implementations, a transition effect may be selected for use between two videos based on continuity and/or amount of motion towards the end of the preceding video and/or continuity and/or amount of motion at the beginning of the subsequent video. Continuity of motion may refer to an extent to which the motion stays consistent or changing (e.g., erratic). An amount of motion may refer to the intensity of motion. For example, the motion in the terminal portion (beginning portion, ending portion) of the video may be assessed to determine whether the motion is consistent within the portion or changing within the portion. The transition effect may not be selected when the motion is changing within the portion. The motion within the terminal portion of the video may be assessed to determine the intensity of the motion. The transition effect may not be selected when the intensity of the motion is below a threshold value, which may indicate that the motion is too weak for application of transition effect. The length of the terminal portions assessed may be same or different for analysis of the continuity and amount of motion. For example, the continuity of motion may be assessed within a terminal portion having a duration of one second while the amount of motion may be assessed within a terminal portion having a duration of a half second. Use of other durations is contemplated.

The modification component 108 may be configured to modify the video edit(s). A video edit may be modified to include the transition effect(s) between the videos. A video edit may be modified by inserting (e.g., applying) the transition effect(s) to transition(s) between the videos. Inserting the transition effect(s) may modify the video edit. Modifying a video edit may include changing the existing video edit and/or generating a new video edit based on modification to the original video edit.

Figure 5A:
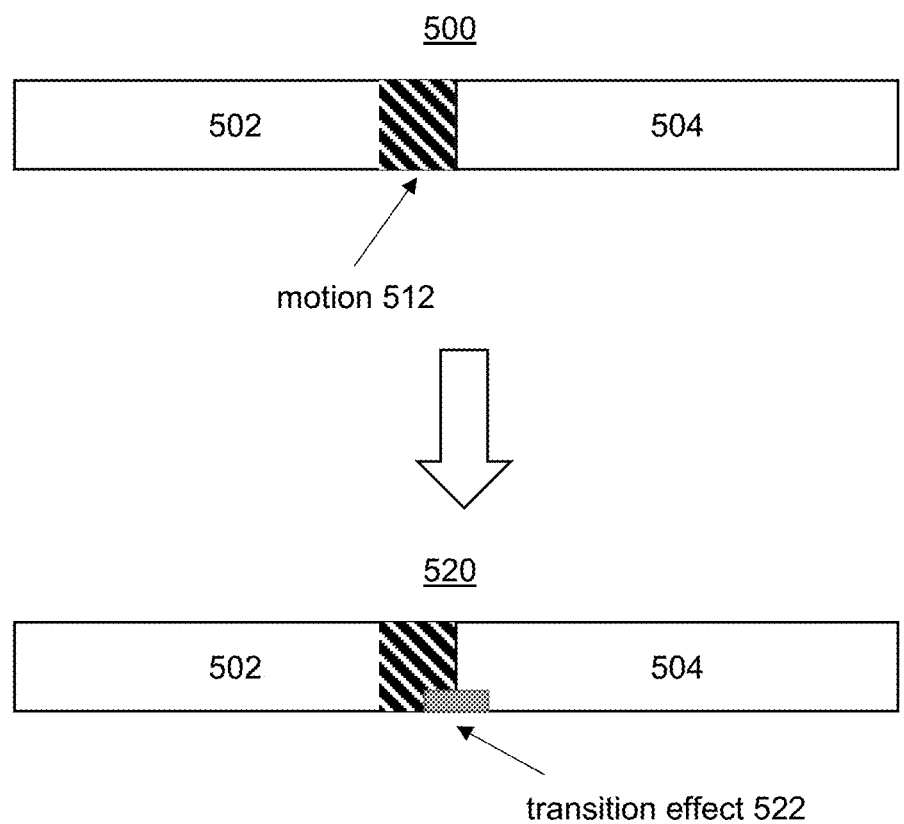
FIG. 5A illustrates an example modification of a video edit to insert a transition effect.
Figure 5B:
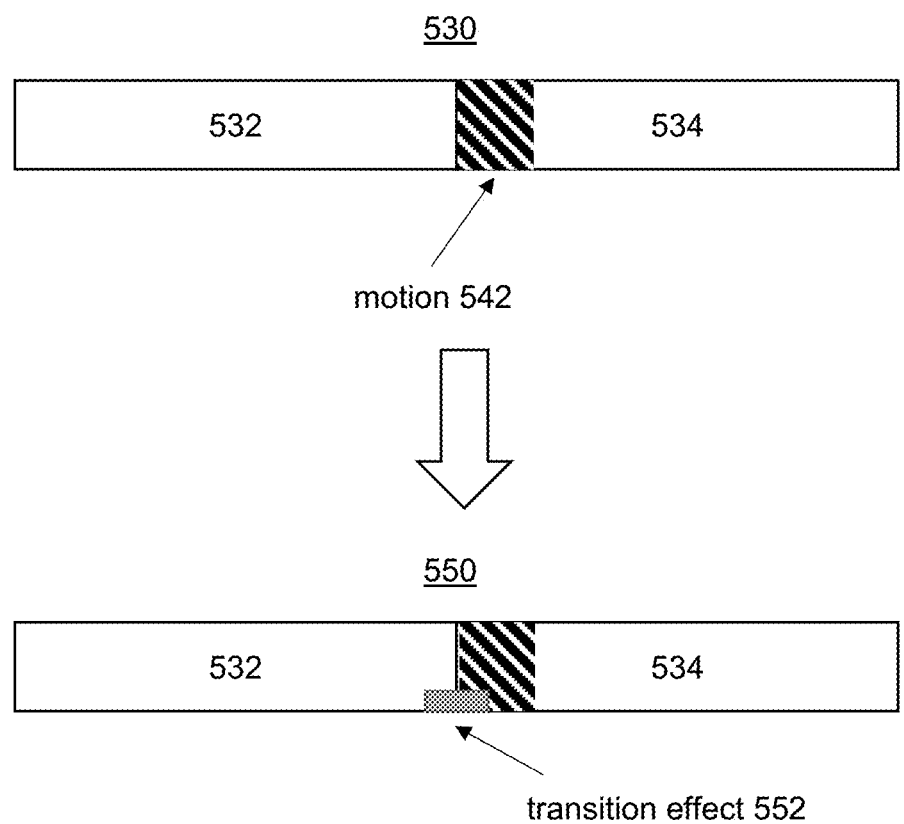
FIG. 5B illustrates an example modification of a video edit to insert a transition effect.
Figure 5C:
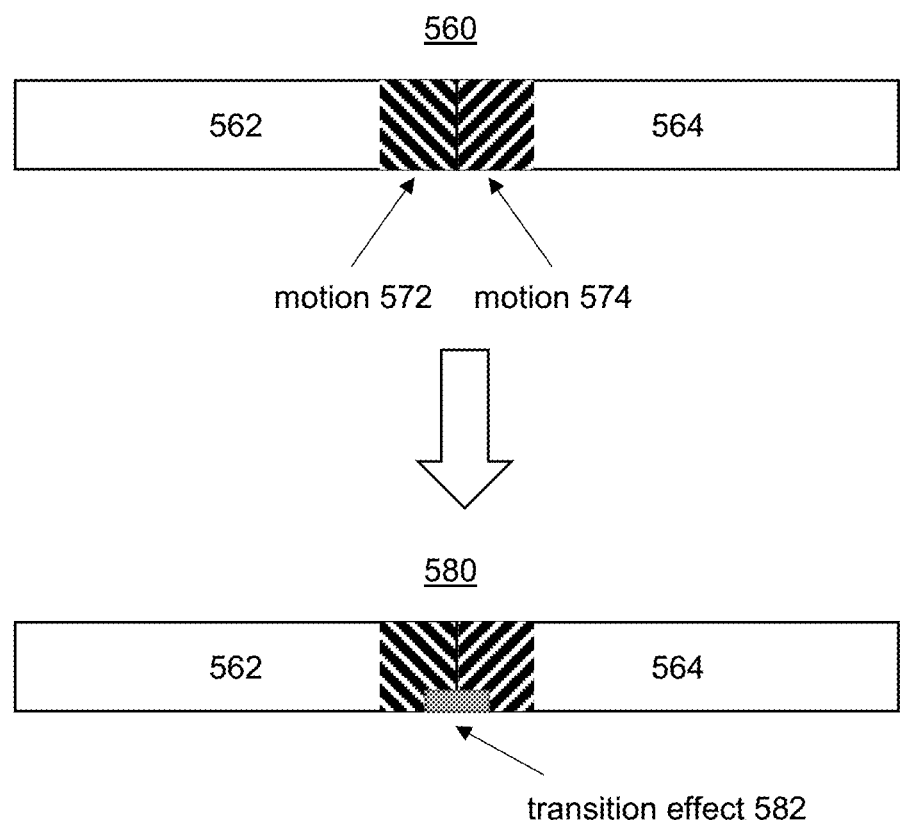
FIG. 5C illustrates an example modification of a video edit to insert a transition effect.

A video edit may be modified to include the transition effect(s) between multiple/adjacent videos. For example, FIGS. 5A, 5B, and 5C illustrate example modifications of video edits to insert transition effects between videos. Other modifications of video edits are contemplated.

In FIG. 5A, a video edit 500 may include a video 502 and a video 504. The video 512 may include motion 512. The motion 512 may be assessed, and a transition effect 522 may be selected based on the motion 512. A modified video edit 520 may be generated by inserting the transition effect 522 between the video 502 and the video 504. The transition effect 522 may be inserted after the video 502 that includes the motion 512. The transition effect 522 may emphasize the motion 512. The transition effect 522 may create continuity of motion during transition between the video 502 and the video 504 within the modified video edit 520.

In FIG. 5B, a video edit 530 may include a video 532 and a video 534. The video 534 may include motion 542. The motion 542 may be assessed, and a transition effect 552 may be selected based on the motion 542. A modified video edit 550 may be generated by inserting the transition effect 542 between the video 532 and the video 534. The transition effect 552 may be inserted before the video 534 that includes the motion 552. The transition effect 552 may emphasize the motion 542. The transition effect 552 may create continuity of motion during transition between the video 532 and the video 534 within the modified video edit 550.

In FIG. 5C, a video edit 560 may include a video 562 and a video 564. The video 562 may include motion 572, and the video 564 may include motion 574. The motion 572 and the motion 574 may be assessed, and a transition effect 582 may be selected based on one or both of the motion 572 and the motion 574. A modified video edit 580 may be generated by inserting the transition effect 582 between the video 562 and the video 564. The transition effect 582 may be inserted after the video 562 and before the video 564. The transition effect 582 may emphasize one or both of the motion 572 and the motion 574. The transition effect 582 may create continuity of motion during transition between the video 562 and the video 564 within the modified video edit 580.

While the transition effects are shown in FIGS. 5A, 5B, and 5C are being inserted to cover same duration within preceding and following videos, this is merely as an example and is not meant to be limiting. In some implementations, the transition effect may be applied to same duration within adjacent videos. In some implementations, the transition effect may be applied to different durations within adjacent videos.

A modified video edit may be generated as an encoded video (e.g., encoded video file) and/or as instructions for presenting the modified video edit. For example, the modified video edit may be generated as an encoded video in a video file, and the video file may be opened in a video player for presentation on one or more displays. The modified video edit may be generated as instructions identifying the videos/the parts of videos that are included in the video edit, along with transition effect(s) between the videos, and a video player may use the instructions to retrieve the video(s) and apply the transition effect(s) for presentation on display(s).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
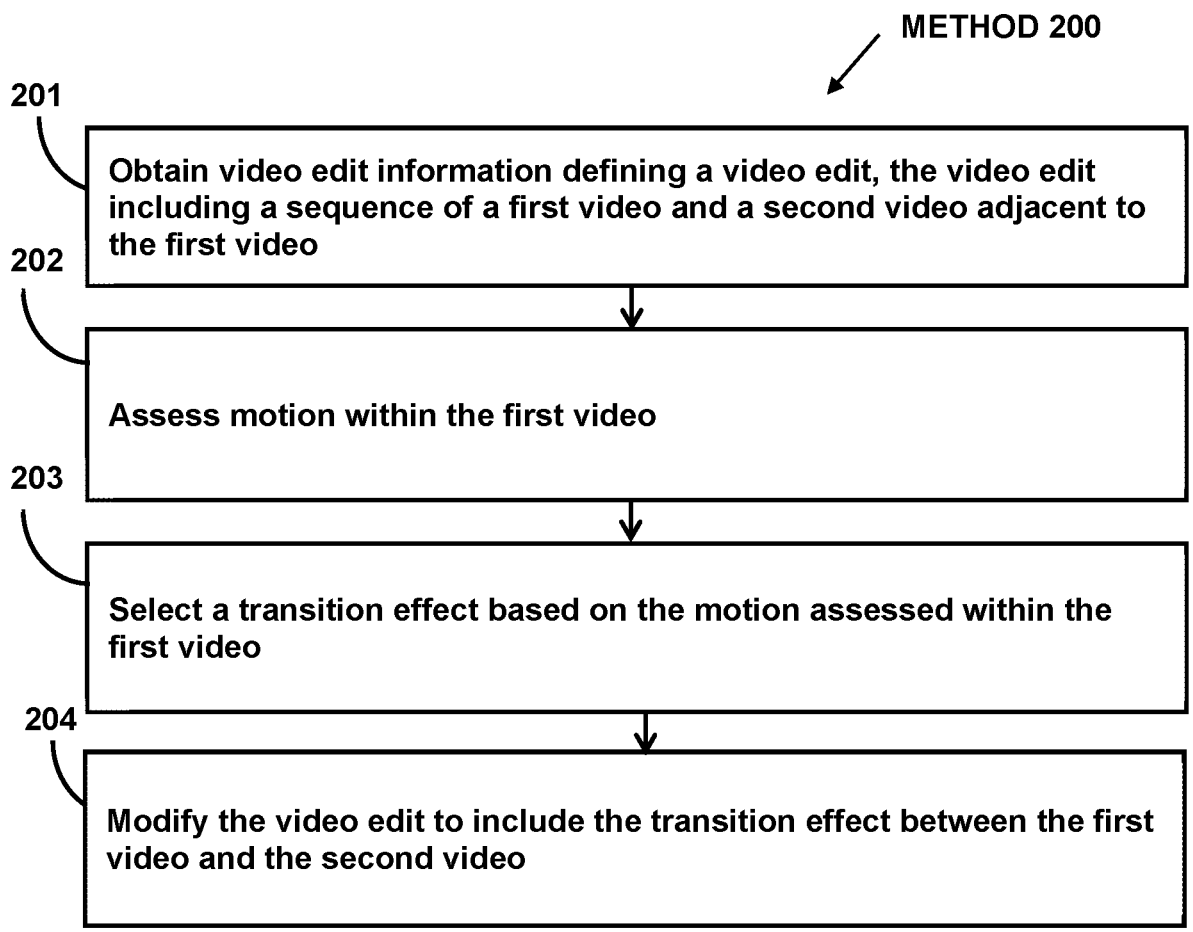
FIG. 2 illustrates an example method for inserting transition effects into video edits.

FIG. 2 illustrates method 200 for inserting transition effects into video edits. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video edit information and/or other information may be obtained. The video edit information may define a video edit. The video edit may include a sequence of a first video and a second video adjacent to the first video. In some implementations, operation 201 may be performed by a processor component the same as or similar to the video edit information component 102 (Shown in FIG. 1 and described herein).

At operation 202, motion within the first video may be assessed. In some implementations, operation 202 may be performed by a processor component the same as or similar to the motion component 104 (Shown in FIG. 1 and described herein).

At operation 203, one or more transition effect(s) may be selected based on the motion assessed within the first video and/or other information. In some implementations, operation 203 may be performed by a processor component the same as or similar to the transition effect component 106 (Shown in FIG. 1 and described herein).

At operation 204, the video edit may be modified to include the transition effect(s) between the first video and the second video. In some implementations, operation 204 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for inserting transition effects into video edits, the system comprising:
one or more physical processors configured by machine-readable instructions to:
obtain video edit information defining a video edit, the video edit including a sequence of a first video and a second video adjacent to the first video;
assess motion within the first video, wherein the motion within the first video is assessed based on position information for the first video, the position information for the first video characterizing positions of an image capture device during capture of the first video;

select a transition effect based on the motion assessed within the first video; and modify the video edit to include the transition effect between the first video and the second video, the first video preceding or following the transition effect in the video edit, wherein the transition effect in the video edit emphasizes the motion assessed within the first video and creates continuity of motion during transition between the first video and the second video within the video edit.

2. The system of claim 1, wherein:

the motion within the first video is assessed as pan motion or dolly motion; and selection of the transition effect based on the motion assessed within the first video includes selection of different transition effects based on the motion within the first video being assessed as the pan motion or the dolly motion.

3. The system of claim 1, wherein the position information for the first video characterizes the positions of the image capture device during the capture of the first video by characterizing speed and/or acceleration of the image capture device during the capture of the first video.

4. The system of claim 1, wherein motion within the second video is assessed, and the transition effect is selected further based on the motion assessed within the second video.

5. A system for inserting transition effects into video edits, the system comprising:

one or more physical processors configured by machine-readable instructions to:

obtain video edit information defining a video edit, the video edit including a sequence of a first video and a second video adjacent to the first video;

assess motion within the first video, wherein the motion within the first video is assessed based on position information for the first video, the position information for the first video characterizing positions of an image capture device during capture of the first video;

select a transition effect based on the motion assessed within the first video; and modify the video edit to include the transition effect between the first video and the second video.

6. The system of claim 5, wherein:

the transition effect emphasizes the motion assessed within the first video; and the transition effect creates continuity of motion during transition between the first video and the second video within the video edit.

7. The system of claim 5, wherein the first video precedes the transition effect in the video edit.

8. The system of claim 5, wherein the first video follows the transition effect in the video edit.

9. The system of claim 5, wherein the position information for the first video characterizes the positions of the image capture device during the capture of the first video by characterizing speed and/or acceleration of the image capture device during the capture of the first video.

10. The system of claim 5, wherein motion within the second video is assessed, and the transition effect is selected further based on the motion assessed within the second video.

11. The system of claim 5, wherein the motion within the first video is assessed as pan motion or dolly motion.

12. The system of claim 11, wherein selection of the transition effect based on the motion assessed within the first video includes selection of different transition effects based on the motion within the first video being assessed as the pan motion or the dolly motion.

13. A method for inserting transition effects into video edits, the method performed by a computing system including one or more processors, the method comprising:

obtaining, by the computing system, video edit information defining a video edit, the video edit including a sequence of a first video and a second video adjacent to the first video;

assessing, by the computing system, motion within the first video, wherein the motion within the first video is assessed based on position information for the first video, the position information for the first video characterizing positions of an image capture device during capture of the first video;

selecting, by the computing system, a transition effect based on the motion assessed within the first video; and modifying, by the computing system, the video edit to include the transition effect between the first video and the second video.

14. The method of claim 13, wherein:

the transition effect emphasizes the motion assessed within the first video; and the transition effect creates continuity of motion during transition between the first video and the second video within the video edit.

15. The method of claim 13, wherein the first video precedes the transition effect in the video edit.

16. The method of claim 13, wherein the first video follows the transition effect in the video edit.

17. The method of claim 13, wherein the position information for the first video characterizes the positions of the image capture device during the capture of the first video by characterizing speed and/or acceleration of the image capture device during the capture of the first video.

18. The method of claim 13, wherein motion within the second video is assessed, and the transition effect is selected further based on the motion assessed within the second video.

19. The method of claim 13, wherein the motion within the first video is assessed as pan motion or dolly motion.

20. The method of claim 19, wherein selecting the transition effect based on the motion assessed within the first video includes selecting different transition effects based on the motion within the first video being assessed as the pan motion or the dolly motion.

* * * * *